United States Patent
Ashrafi et al.

(10) Patent No.: US 6,560,518 B1
(45) Date of Patent: May 6, 2003

(54) ALGORITHM FOR COMPUTING VEHICLE'S STEERING RATIO UNDER DYNAMIC MANEUVER

(75) Inventors: Behrouz Ashrafi; Dinu Petre Madau, both of Dearborn, MI (US)

(73) Assignee: Ford Motor Company, Dearborn, MI (US)

(*) Notice: Subject to any disclaimer, the term of this patent is extended or adjusted under 35 U.S.C. 154(b) by 0 days.

(21) Appl. No.: 09/188,058

(22) Filed: Nov. 6, 1998

(51) Int. Cl.[7] .................. A01B 69/00; B62D 11/00; B62D 5/04
(52) U.S. Cl. .................. 701/41; 701/42; 180/443; 180/446
(58) Field of Search .................. 701/36, 41, 42, 701/44; 180/415, 443, 446

(56) References Cited

U.S. PATENT DOCUMENTS

| | | | |
|---|---|---|---|
| 4,706,771 A | 11/1987 | Kawabe et al. | 180/142 |
| 5,001,637 A * | 3/1991 | Shiraishi et al. | 701/41 |
| 5,423,391 A | 6/1995 | Shimizu | 180/79.1 |
| 5,710,705 A | 1/1998 | Eckert | 701/83 |
| 5,742,919 A * | 4/1998 | Ashrafi et al. | 701/70 |
| 5,765,118 A * | 6/1998 | Fukatani | 701/72 |
| 5,790,966 A | 8/1998 | Madau et al. | 701/41 |
| 5,809,434 A * | 9/1998 | Ashrafi et al. | 701/1 |

* cited by examiner

*Primary Examiner*—Jacques H. Louis-Jacques
*Assistant Examiner*—Brian J. Broadhead
(74) *Attorney, Agent, or Firm*—Gregory P. Brown

(57) ABSTRACT

For a motor vehicle 10, a method for generating a map of a vehicle's dynamic steering ratio as a function of vehicle velocity and yaw rate. The steering ratio accounts for vehicle system compliance during dynamic maneuvers. The mapping of the steering ratio is used in an algorithm to estimate the vehicle's steering wheel angle while the vehicle is in a dynamic maneuver such as a turning maneuver. This estimation is based on the front wheel steer angles that are derived from the yaw rate and longitudinal velocity and the steering ratio.

2 Claims, 3 Drawing Sheets

ALGORITHM FOR COMPUTING VEHICLE'S STEERING RATIO UNDER DYNAMIC MANEUVER

BACKGROUND OF INVENTION

1. Field of Invention

This invention relates in general to a method for determining a vehicle's steering ratio and more particularly for generating a map of vehicle's steering ratio for determining the steering angle while the vehicle is turning.

2. Prior Art

U.S. Pat. No. 5,790,966 entitled "Method For Determining Steering Position of Automotive Steering Mechanism" issued on Aug. 4, 1998 to Madau et al. and assigned to a common assignee relates to the determination of a steering wheel angel of a vehicle. In particular the patent teaches a method for determining a center position for the steering sensor output every time the vehicle is started.

The method employs the use of a yaw rate sensor for computing an estimate of the actual steering position to provide immediate and accurate steering position data using the steering sensor signal for controlling an automotive device. The method employs an algorithm having three levels to determine the center position.

The first level is an initial center algorithm; the second level is an interim center algorithm and the third level is final center algorithm. The first level in this prior art patent provides a very rapid estimate of the center position when the operator first starts the vehicle. Soon the computing system in the vehicle determines when it senses the steering mechanism is substantially positioned in the estimated center position. Once this switch to the second level of the algorithm is made, the computer does not return to the algorithm until the vehicle ignition is turned off and then turned on.

This invention is an improvement over the prior art in the determination of the vehicle's dynamic steering ratio as a function of the vehicle velocity and yaw rate while the vehicle is in a dynamic maneuver.

It is a principal advantage of the present system to make an accurate determination of the center position of the vehicle while the vehicle is going at a very slow speed.

It is another advantage to map the steering ratio of the vehicle and use this map to determine the vehicle's steering wheel angle while the vehicle is in a dynamic maneuver.

SUMMARY OF THE INVENTION

A method for mapping a vehicle steering ratio as a function of vehicle velocity and yaw rate beginning with determining the length, L, of the wheelbase of the vehicle. The understeer coefficient, $K_{us}$, of the vehicle is then determined from the mechanical design of the vehicle. The vehicle is then driven at an accelerated speed, U, from zero to a predetermined value. The vehicle is put through a turning maneuver by turning the vehicle steering wheel through a plurality of steering wheel angles at predetermined angular rate about a known vehicle center axis in the clockwise direction and repeat in the counterclockwise direction. This is typically about 1000-degree steering range.

The yaw rate, r, of the vehicle is measured at each one of the plurality of predetermined steering wheel angles during the step of turning. From these measurements, the front tire steer angles, $\delta(\{f\})$, of the vehicle is calculated according to the equation $$\delta\{f\}=r/U*[L+U^2(K_{us}/g)]$$

for each value of U and each predetermined steering wheel angle. Next the steering ratio of the front tires is calculated from the predetermined steering wheel angle and the front tire steer angle. All of these steps are repeated for a plurality of vehicle speeds and the predetermined steering wheel angles from steering wheel lock to lock position. These results are plotted for each speed point and predetermined steering wheel angle creating a family of curves. A linear curve is calculated through each curve representing a steering ratio wherein the linear curve follows the general equation $$y=mx+b$$

wherein b is the value of steering ratio at zero velocity for each predetermined steering wheel angle and m is the slope of the line or curve. Points on all of the linear curves are placed as a map in a computing look-up table located in the vehicle ECU.

These and other advantages of the present invention will be found in the following detailed description and drawings.

DETAILED DESCRIPTION OF THE PREFERRED EMBODIMENT

Figure 1:
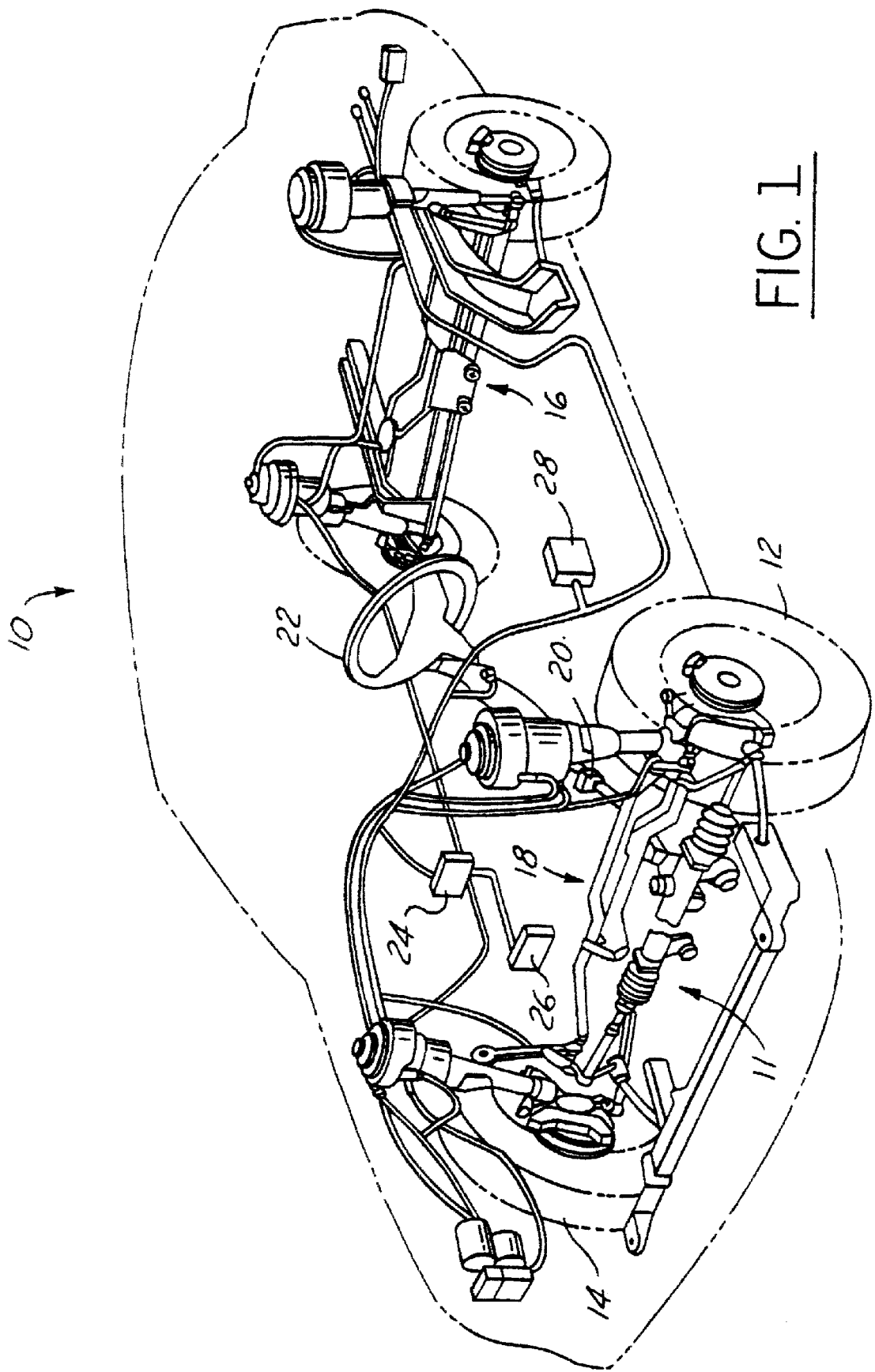
FIG. 1 is a perspective drawing of a motor vehicle.

Referring to the Figs. by the characters of reference there is illustrated in FIG. 1 a perspective view of a motor vehicle 10. In the view there is illustrated a front axle 11 having a pair of front wheels 12, 14, one at each end respectively and a rear axle 16 spaced from the front axle 11. The distance between the two axles 11, 16 is defined as the wheelbase of the vehicle and is typically measured in meters. Operatively connected to the front axle 11 is a steering wheel mechanism 18 for causing the vehicle front wheels 12, 14 to turn clockwise or counterclockwise under control of a vehicle operator. A steering sensor 20 interposed the steering wheel 22 and the front axle 11 and is operatively connected to the steering wheel 22. Located in the vehicle are an electronic control unit 24, ECU, four wheelspeed sensors 26 (only one shown), one at each wheel, from which is calculated the velocity and acceleration of the vehicle, and a yaw sensor 28.

Figure 2:
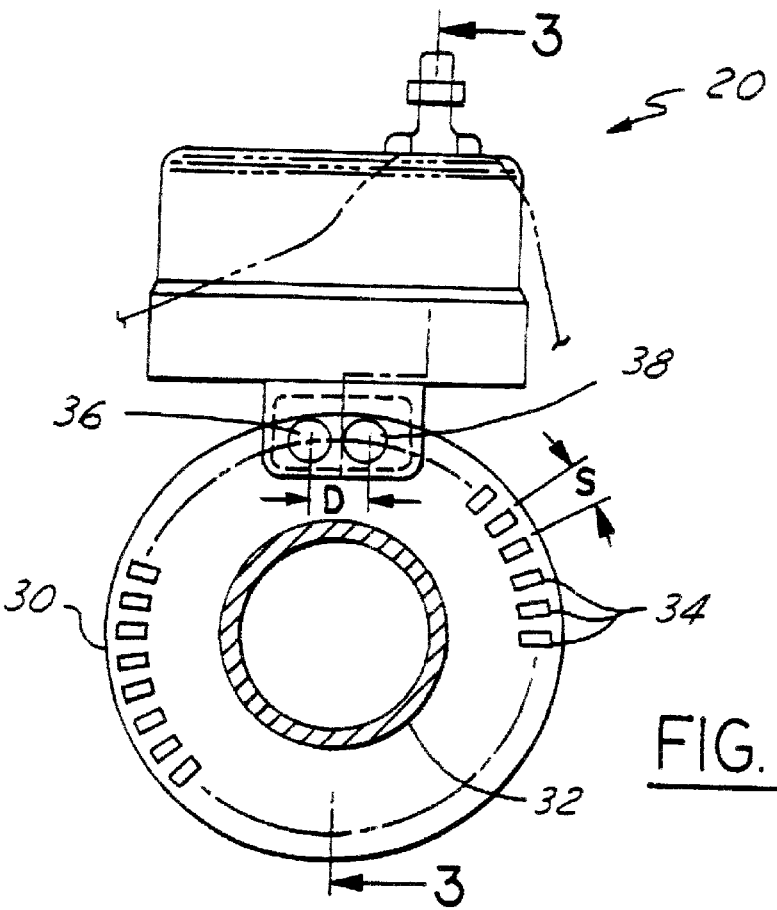
FIG. 2 is a plan view of a steering sensor.
Figure 3:
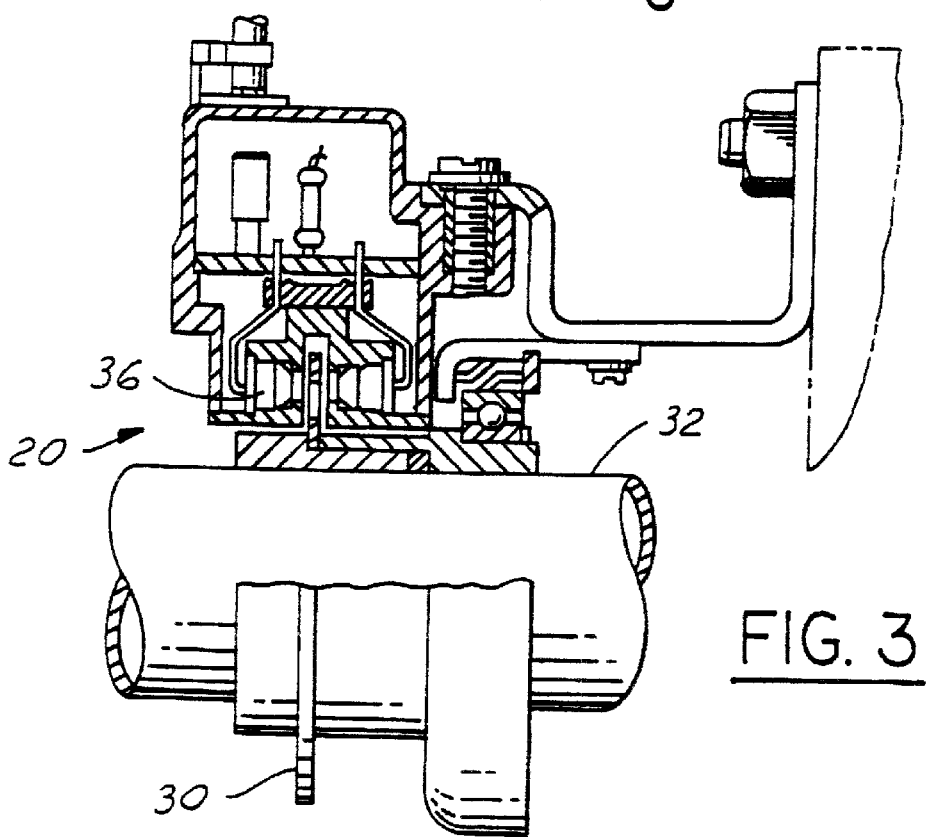
FIG. 3 is a sectional side view taken along line 3—3 in FIG. 2.

The steering sensor 20 is illustrated in FIGS. 2 and 3. This sensor 20 comprises a shutter wheel 30 attached to the steering shaft 32. The steering shaft 32 rotates in unison with the steering wheel 22 as the operator of the vehicle turns the steering wheel. The shutter wheel 30 has a plurality of apertures 34, in this case forty-eight in number, that serve to trigger the activity of spaced apart detectors 36, 38 as the shutter wheel 30 is rotated with the steering system of the vehicle. The two detectors 36, 38 detect movement of the shutter wheel 30 and in the present embodiment, there are forty-eight apertures around the shutter wheel 30 giving a signal 192 times during one revolution of the steering wheel 22. Thus, each aperture results in 1.875 degrees of rotation of the steering wheel 22.

The steering sensor 20 resolution can be improved by increasing the number of apertures 34 on the shutter wheel 30. By the use of the two spaced apart detectors 36, 38, the rotational direction of the shutter wheel 30 can be determined by an appropriate detector circuit, which is not shown and which is well known and more particularly described in U.S. Pat. No. 5,790,966.

The electronic control unit or ECU 24, has a plurality of algorithms contained therein for control the operation of the vehicle 10. Such algorithms are operational for controlling fuel management, spark ignition, brake controls, etc., to name but a few of the systems which are typically controlled in a manner that is well known by those skilled in the art. In particular there is a look-up table that is responsive to the vehicle speed input and the steering sensor 20 for determining the vehicle's dynamic steering ratio for use by one or more of the algorithms.

In U.S. Pat. No. 5,790,966 there is taught a Find Steering Center algorithm that is designed to estimate the steering wheel angle of the vehicle relative to the angle corresponding to the vehicle's rectilinear motion. There are three levels to this algorithm. Each level is designed to handle a specific driving maneuver. The first level determines the center position according to an initial center algorithm that is used to provide a very rapid estimate of the center position when the vehicle operator first starts the vehicle.

The improvement of this invention is to define the vehicle's steering wheel angle at a predetermined speed while the vehicle is in a dynamic maneuver such as turning that is found in parking lot maneuvers. It is a function of the Find Steering Center algorithm to estimate the vehicle's steering wheel angle relative to the angle that will make the vehicle travel along a straight line. This estimation can be obtained from the following relationship;

Steering Wheel Angle=Steering Ratio*$\delta\{f\}$*C (1) where $\delta\{f\}$ is the average of the front tire steer angles and "C" is a constant equal to 57.295 degrees/radian.

From equation (1) this invention is a method for mapping a vehicle steering ratio as a function of vehicle velocity and yaw rate. First the vehicle's wheelbase length "L" is determined. Typically this is a known value for a whole series of vehicles in a given model line. In addition the vehicle understeer coefficient $K_{us}$, is determined. Again this an engineered value for a given model line with a known steering mechanism.

In order to determine the quantity, $\delta\{f\}$, the front tire steer angles of the vehicle, vehicle testing is performed and the vehicle's yaw rate, speed and exact steering wheel angle are measured. This is accomplished by accelerating the vehicle from zero KPH to a predetermined value as the vehicle steering wheel 22 is turned through a plurality of steering wheel angles. The output of the steering sensor 20 is recorded. The vehicle is turned about a known vehicle center axis in the clockwise direction and is repeated in the counterclockwise direction. Both the vehicle speed and yaw rate are measured and recorded at each predetermined steering wheel angle as the vehicle is turning.

The front tire steer angles, $\delta\{f\}$, of the vehicle are the calculated according to the equation $$\delta\{f\}=r/U*[L+U^2(K_{us}/g)] \quad (2)$$

for each value of U and each predetermined steering wheel angle. The value "g" in equation (2) is the force of gravity. Then having the exact steering wheel angle, equation (1) can be used to solve for the steering ratio, namely:

Steering Ratio=(Exact Steering Wheel angle)/$\delta\{f\}$*C (3)

Figure 4:
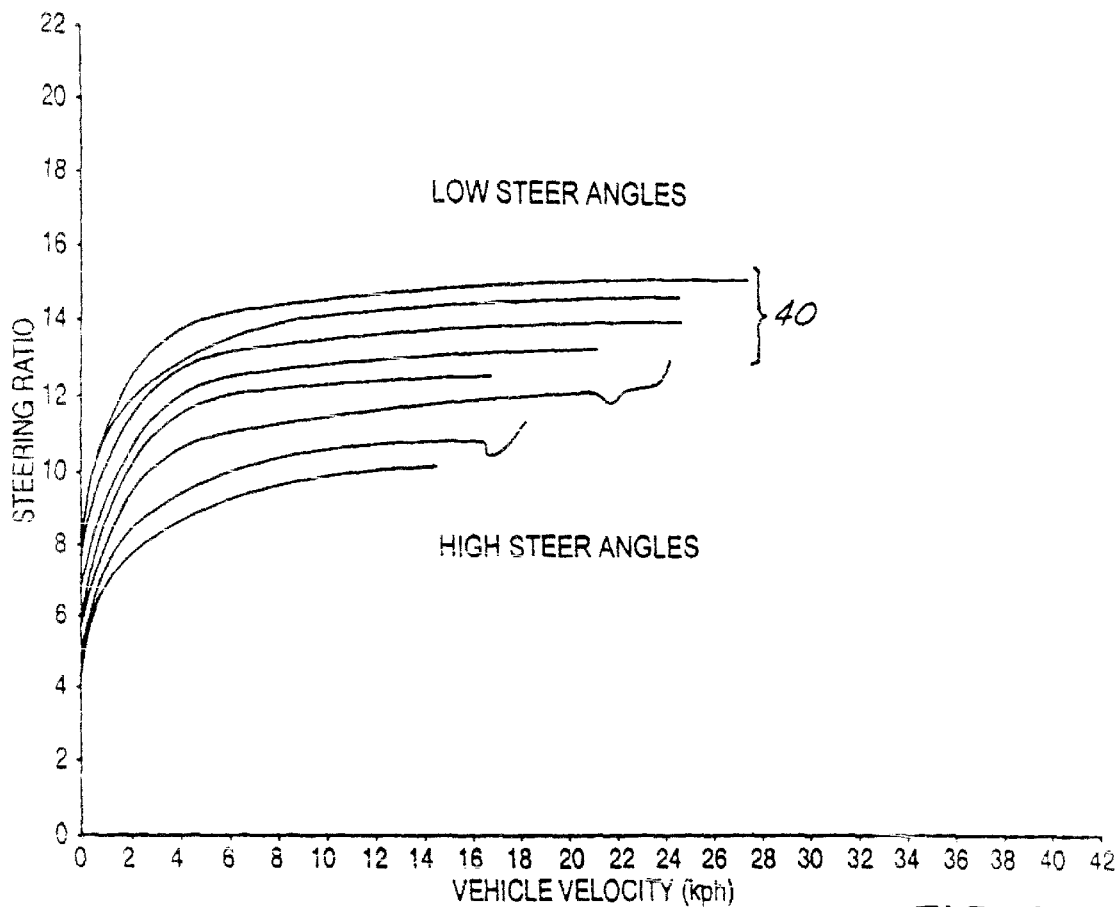
FIG. 4 is a graph of steering ratio as a function of vehicle velocity for several steering wheel angles.

This procedure is repeated for the plurality of vehicle speeds and predetermined steering wheel angles such as every 20-degree increment going from left to right lock of the steering wheel. Each of the results are then plotted for each speed point and steering wheel angle creating a family of curves 40 as shown in FIG. 4. In a typical case this will result in a steering range of over one thousand degrees.

Figure 5:
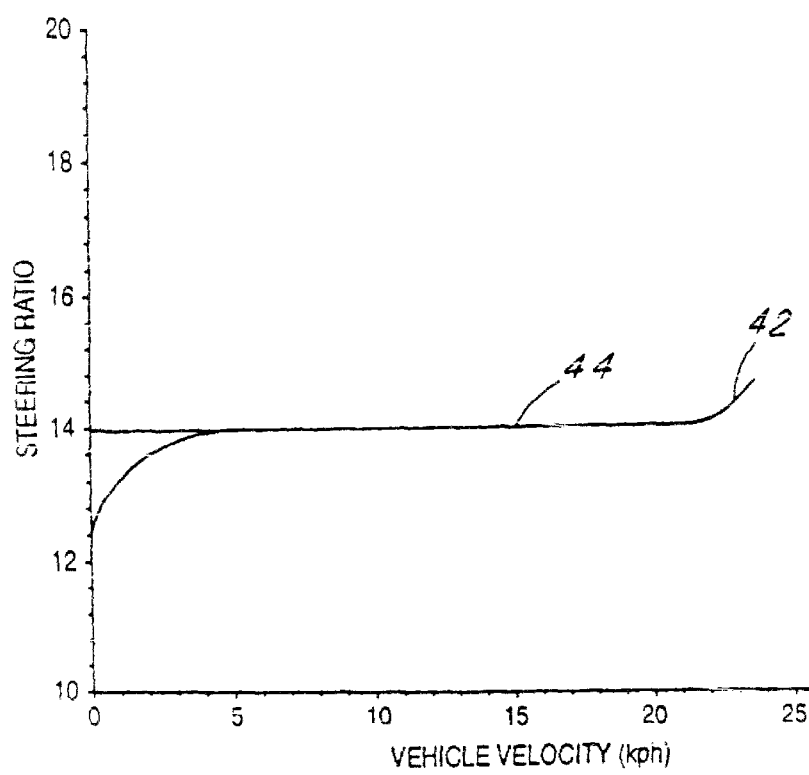
FIG. 5 is a plot of the steering ratio at one particular steering wheel angle.

As illustrated in FIG. 5, for one curve 42 in the family of curves 40, a linear curve 44 is fit through each curve representing a predetermined steering ratio wherein the linear curve follows the general equation $$y=mx+b \quad (4)$$

wherein b is the value of steering ratio at zero velocity for each predetermined steering wheel angle and m is the slope of the curve 44.

It has been shown and illustrated how the vehicle's steering wheel angle can be very accurately estimated from its speed and yaw rate.

What we claim:

1. A method for mapping a vehicle steering ratio as a function of vehicle velocity and yaw rate having the steps of:

determining the length, L, of the wheelbase of the vehicle;

determining the understeer coefficient, $K_{us}$, of the vehicle;

accelerating the speed, U, of the vehicle past a predetermined value;

turning the vehicle steering wheel through a plurality of steering wheel angles at predetermined angular rate about a known vehicle center axis in the clockwise direction and repeat in the counterclockwise direction;

measuring the yaw rate, r, of the vehicle at each one of the plurality of predetermined steering wheel angles;

calculating the front tire steer angles, $\delta\{f\}$, of the vehicle according to the equation $$\delta\{f\}=r/U*[L+U^2(K_{us}/g)]$$

for each value of U and each predetermined steering wheel angle;

calculating the steering ratio of the front tires from the predetermined steering wheel angle and the front tire steer angle;

repeating the previous steps for a plurality of vehicle speeds and predetermined steering wheel angles; and then calculating a linear curve through each curve representing a steering ratio wherein the linear curve follows the general equation $$y=mx+b$$

wherein b is the value of steering ratio at zero velocity for each predetermined steering wheel angle and m is the slope of the curve.

2. A method for mapping a vehicle steering ratio as a function of vehicle velocity and yaw rate according to claim 1 additionally including the step of:

measuring the steering ratio of the vehicle; and then calculating the steering wheel angle estimate, SWAEST, at each velocity from the front tire steering angle according to the equation SWAEST=steering ratio*$\delta\{f\}$*57.295 where 57.295 is a constant representing the number of degrees per radian.

* * * * *